(12) United States Patent
Lee et al.

(10) Patent No.: US 12,248,240 B2
(45) Date of Patent: Mar. 11, 2025

(54) CAMERA MODULE

(71) Applicant: SAMSUNG ELECTRO-MECHANICS CO., LTD., Suwon-si (KR)

(72) Inventors: Sang Jin Lee, Suwon-si (KR); Myung Jae Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 361 days.

(21) Appl. No.: 17/578,637

(22) Filed: Jan. 19, 2022

(65) Prior Publication Data

US 2023/0064564 A1 Mar. 2, 2023

(30) Foreign Application Priority Data

Sep. 2, 2021 (KR) .................. 10-2021-0116929

(51) Int. Cl.
| | |
|---|---|
| G02B 27/64 | (2006.01) |
| G03B 3/10 | (2021.01) |
| G03B 5/00 | (2021.01) |
| G03B 5/02 | (2021.01) |
| G03B 30/00 | (2021.01) |
| H01F 7/08 | (2006.01) |

(52) U.S. Cl.
CPC ............ *G03B 5/00* (2013.01); *G02B 27/646* (2013.01); *G03B 3/10* (2013.01); *G03B 5/02* (2013.01); *G03B 30/00* (2021.01); *H01F 7/081* (2013.01); *G03B 2205/0007* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

| | | | | |
|---|---|---|---|---|
| 2015/0160470 A1* | 6/2015 | Terajima | ............... | G02B 27/646 359/557 |
| 2015/0212336 A1* | 7/2015 | Hubert | ................... | H04N 23/55 359/554 |
| 2017/0097517 A1* | 4/2017 | Chen | .................. | H02K 41/0356 |
| 2017/0139225 A1* | 5/2017 | Lim | ..................... | H04N 23/687 |
| 2018/0224631 A1* | 8/2018 | Ichihashi | ............... | H01H 47/22 |
| 2019/0058817 A1* | 2/2019 | Seo | ......................... | H04N 23/51 |
| 2020/0301095 A1 | 9/2020 | Sun et al. | | |

FOREIGN PATENT DOCUMENTS

| | | | |
|---|---|---|---|
| JP | 2007-151367 A | | 6/2007 |
| JP | 2020-154306 A | | 9/2020 |
| KR | 10-2005-0014542 A | | 2/2005 |
| KR | 2005014542 A | * | 2/2005 |
| KR | 10-1270656 B1 | | 6/2013 |
| KR | 10-2013-0078513 A | | 7/2013 |

* cited by examiner

*Primary Examiner* — Derek S. Chapel
(74) *Attorney, Agent, or Firm* — NSIP Law

(57) ABSTRACT

A camera module includes a movable portion including a lens barrel, an accommodating portion configured to receive the movable portion, and a driving unit configured to drive the movable portion, comprising a driving magnet integrated with the movable portion. A cross-sectional area of the driving magnet decreases as a distance thereof from an optical axis increases.

18 Claims, 19 Drawing Sheets

CAMERA MODULE

CROSS-REFERENCE TO RELATED APPLICATION

This application claims the benefit under 35 USC 119(a) of Korean Patent Application No. 10-2021-0116929 filed on Sep. 2, 2021 in the Korean Intellectual Property Office, the entire disclosure of which is incorporated herein by reference for all purposes.

BACKGROUND

1. Field

The following description relates to a camera module.

2. Description of Related Art

Camera modules may include driving units for driving lens barrels. For example, a camera module may include a driving unit to drive the lens barrel in the optical axis or a direction intersecting the optical axis. The driving unit of the camera module may include a driving magnet and a driving coil. The driving magnet and the driving coil may be disposed to face the lens barrel and the housing, respectively, and may provide the driving force necessary for driving the lens barrel. However, in the camera module configured as described above, when the lens barrel and the housing collide due to external shocks or vibrations, a phenomenon in which the driving magnet is detached from the attached position is likely to occur.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a movable portion including a lens barrel, an accommodating portion configured to receive the movable portion, and a driving unit configured to drive the movable portion, comprising a driving magnet integrated with the movable portion. A cross-sectional area of the driving magnet decreases as a distance thereof from an optical axis increases.

A cross-sectional shape of the driving magnet in the optical axis direction may be trapezoidal.

A cross-sectional shape of the driving magnet in a direction, intersecting the optical axis, may be trapezoidal.

The driving magnet may be accommodated within a groove of the movable portion.

The driving unit may be configured to drive the movable portion in the optical axis direction.

The driving unit may be configured to drive the movable portion in a direction intersecting the optical axis.

The driving magnet may be disposed on each of a first side of the movable portion and a second side adjacent to the first side.

The camera module may further include a yoke member disposed on a surface of the driving magnet.

The yoke member includes a protrusion configured to engage the driving magnet.

In another general aspect, a camera module includes a housing, a first movable frame accommodated in the housing, a second movable frame disposed on the first movable frame, a lens barrel, disposed on the second movable frame, comprising a lens, a first driving unit, configured to drive the first movable frame in a direction of an optical axis of the lens comprising a first driving magnet integrated with the first movable frame, and a second driving unit configured to drive the second movable frame and the lens barrel in a direction intersecting the optical axis. The first driving magnet has an inclined surface with respect to the optical axis.

the first driving unit may further include a first driving coil disposed on the housing to face the first driving magnet.

The second driving unit may include a second driving magnet disposed on different side surfaces of the lens barrel, and a second driving coil disposed on the housing to face the second driving magnet.

The camera module may further include a first ball bearing disposed between the housing and the first movable frame, a second ball bearing disposed between the first movable frame and the second movable frame, and a third ball bearing disposed between the second movable frame and the lens barrel.

The camera module may further include a yoke member disposed on a side of the first driving magnet.

The yoke member may further include a protrusion configured couple to the first driving magnet.

The first movable frame may further include a reinforcing member integrated with the first movable frame, connected to the yoke member, and configured to prevent deformation of the first movable frame.

In another general aspect, a camera module includes a movable portion including a lens barrel, an accommodating portion configured to receive the movable portion, and a driving unit configured to drive the movable portion, comprising a driving magnet integrally formed with the movable portion. The driving magnet has a beveled edge.

The driving magnet may be accommodated within a groove of the movable portion.

The driving unit may be configured to drive the movable portion in an optical axis direction.

The driving unit may be configured to drive the movable portion in a direction intersecting an optical axis of the camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
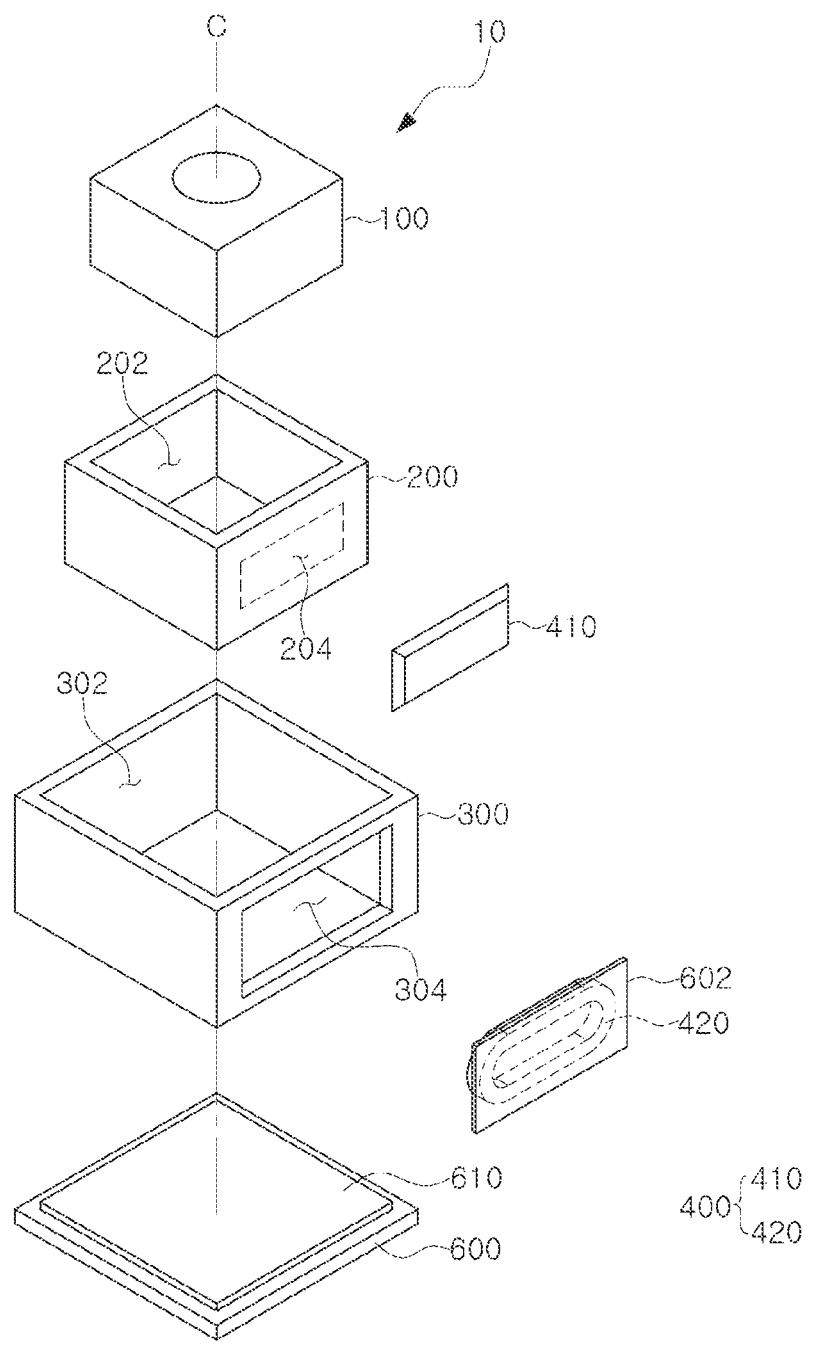
FIG. 1 is an exploded perspective view of a camera module according to an example.
Figure 2:
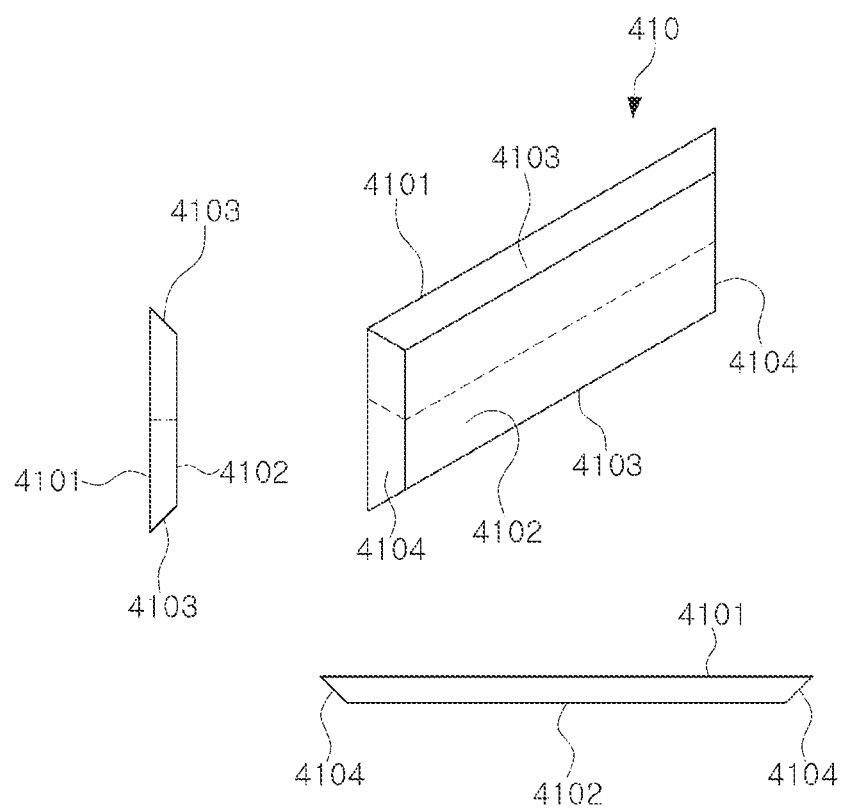
FIG. 2 is an enlarged perspective view of a driving magnet illustrated in FIG. 1.
Figure 3:
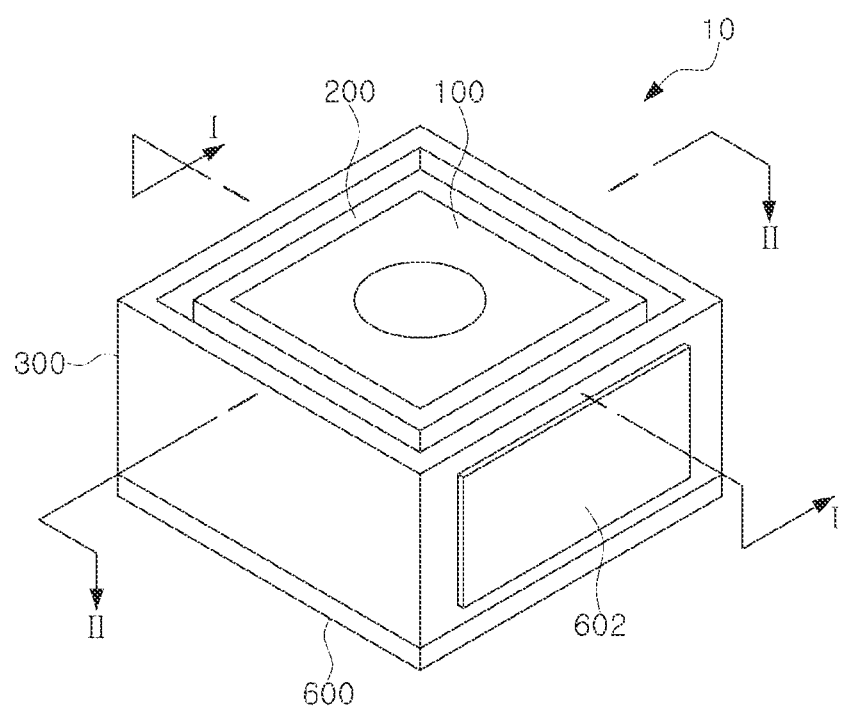
FIG. 3 is a combined perspective view of the camera module illustrated in FIG. 1.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The camera module disclosed herein may be mounted on an electronic device. For example, the camera module may be mounted on a portable terminal, a notebook computer, a VR device, glasses, or the like. However, the electronic devices in which the camera module may be mounted are not limited to the aforementioned devices. For example, the camera module may be mounted in any portable electronic device such as a portable game machine and the like.

The camera module disclosed herein is configured to prevent a problem where external shocks or vibrations separate the driving unit. For example, the camera module is configured to prevent the problem in which the driving magnet of the driving unit is separated from the movable portion by shocks or vibrations.

The camera module may include a driving unit integrally formed with the movable portion in one form for solving the above-described problems. For example, the driving magnet of the driving unit may be integrally formed with the movable portion by insert injection or double injection.

In another form, the camera module may include a driving magnet having a reduced cross-sectional area as it moves away from the optical axis. In addition, the driving magnet may be integrally formed with the movable portion as in one form above.

In the camera module having the above-described forms, since the driving magnet is integrally formed with the movable portion, the phenomenon in which the driving magnet is separated from the movable portion by external shocks and vibrations may be prevented or reduced. In addition, in the camera module disclosed herein, the process of attaching the driving magnet to the movable portion may be omitted by manufacturing the driving magnet and the movable portion through insert injection.

Hereinafter, an example of the present disclosure will be described in detail based on the accompanying drawings.

First, a camera module according to an example will be described with reference to FIGS. 1 to 5.

A camera module 10, according to an example, may include a lens barrel 100, a movable portion 200, an accommodating portion 300, and a driving unit 400. However, the configuration of the camera module 10 is not limited to the above-described configurations. For example, the camera module 10 may further include a substrate 600 on which an image sensor 610 is mounted.

The lens barrel 100 may include a lens. For example, the lens barrel 100 may include one or more lenses sequentially disposed along an optical axis C. The lens barrel 100 may be configured to form an image by incident light on the image sensor 610. For example, the lens barrel 100 may be configured to form an image on the image sensor 610 by light incident through the lens accommodated in the lens barrel 100. The lens barrel 100 may include a unit for adjusting the amount of incident light. For example, the lens barrel 100 may further include an aperture disposed on the object side of a frontmost lens or between the lens and the lens.

Although the lens barrel 100 illustrated in FIG. 1 is formed to have a hexahedral shape, the outer shape of the lens barrel 100 is not limited to a hexahedral shape. For example, the lens barrel 100 may also be formed to have a cylindrical shape.

The movable portion 200 may be configured to be coupled to the lens barrel 100. For example, an accommodation space 202 for accommodating the lens barrel 100 may be formed in the movable portion 200. The accommodation space 202 may be formed to have substantially the same shape and the same size as the cross-section of the lens barrel 100. Accordingly, the lens barrel 100 may be firmly fixed to the accommodation space 202 of the movable portion 200. For tight coupling between the lens barrel 100 and the movable portion 200, an adhesive may be injected into the coupling portion between the lens barrel 100 and the movable portion 200, or the coupling portion between the lens barrel 100 and the movable portion 200 may be fused by using a heat source such as a laser. For reference, the movable portion 200 described herein encompasses all members that may be driven integrally with the lens barrel 100, and may be replaced with other terms. For example, the movable portion 200 may be replaced with terms such as a barrel holder, a lens carrier, or a lens holder.

The accommodating portion 300 may be configured to accommodate the lens barrel 100 and the movable portion 200. For example, an accommodation space 302 capable of accommodating the lens barrel 100 and the movable portion 200 may be formed inside the accommodating portion 300. The accommodation space 302 may be formed in an open shape along the optical axis (C). Accordingly, the lens barrel 100 and the movable portion 200 may move in the direction of the optical axis C. The accommodating portion 300 may be configured to enable the disposition of the driving unit 400. For example, an opening 304 may be formed in one side of the accommodating portion 300 such that some components of the driving unit 400 may be disposed. The opening 304 may be connected to the accommodation space 302 of the accommodating portion 300. Accordingly, the driving unit 400 disposed in an inner side of the opening 304 may be exposed to the accommodation space 302. For reference, the accommodating portion 300 described herein encompasses all members configured to accommodate the movable portion 200, and may be substituted with other terms. For example, the accommodating portion 300 may be replaced with terms such as a housing and a case.

The driving unit 400 may be configured to drive the lens barrel 100 and the movable portion 200. For example, the driving unit 400 may drive the lens barrel 100 and the movable portion 200 in the optical axis C direction. The driving unit 400 may include a driving magnet 410 and a driving coil 420. However, the configuration of the driving unit 400 is not limited to the driving magnet 410 and the driving coil 420.

The driving unit 400 may be disposed on the movable portion 200 and the accommodating portion 300, respectively. For example, the driving magnet 410 may be disposed on the movable portion 200, and the driving coil 420 may be disposed on the accommodating portion 300. The driving magnet 410 and the driving coil 420 may be disposed to face each other. For example, the driving magnet 410 may be disposed on one side of the movable portion 200 facing the opening 304 of the accommodating portion 300, and the driving coil 420 may be disposed in the opening 304.

The driving unit 400 may be firmly fixed to the movable portion 200 and the accommodating portion 300. For example, the driving magnet 410 may be integrally formed with the movable portion 200, and the driving coil 420 may be firmly fixed to the opening 304 of the accommodating portion 300 via a flexible substrate 602. For example, the driving magnet 410 may be integrally molded with the movable portion 200 by insert injection or double injection molding.

The driving magnet 410 may be formed to not be separated from the movable portion 200. In detail, the driving magnet 410 formed on the movable portion 200 may be formed so as not to be separated from the movable portion in a direction away from the optical axis C. The shape of the driving magnet 410 will be described with reference to FIG. 2.

The driving magnet 410 may include one or more inclined surfaces. In more detail, four side surfaces 4103 and 4104 of the driving magnet 410 connecting a rear surface 4101 and a front surface 4102 may be formed to incline. In addition, the driving magnet 410 may be formed in a form in which the cross-sectional area decreases as the distance from the optical axis C increases. For example, the area of the rear surface 4101 may be larger than the area of the front surface 4102. As another example, the cross-sectional shape of the driving magnet 410 in the optical axis direction and the cross-sectional shape in the direction intersecting the optical axis may be substantially trapezoidal.

The camera module 10, including the above-described components, may be configured to have a relatively low height in the optical axis C direction, as illustrated in FIG.

3. Therefore, according to this example, the camera module 10 may be easily mounted in a thin-sized small terminal such as a smartphone or the like.

Figure 4:
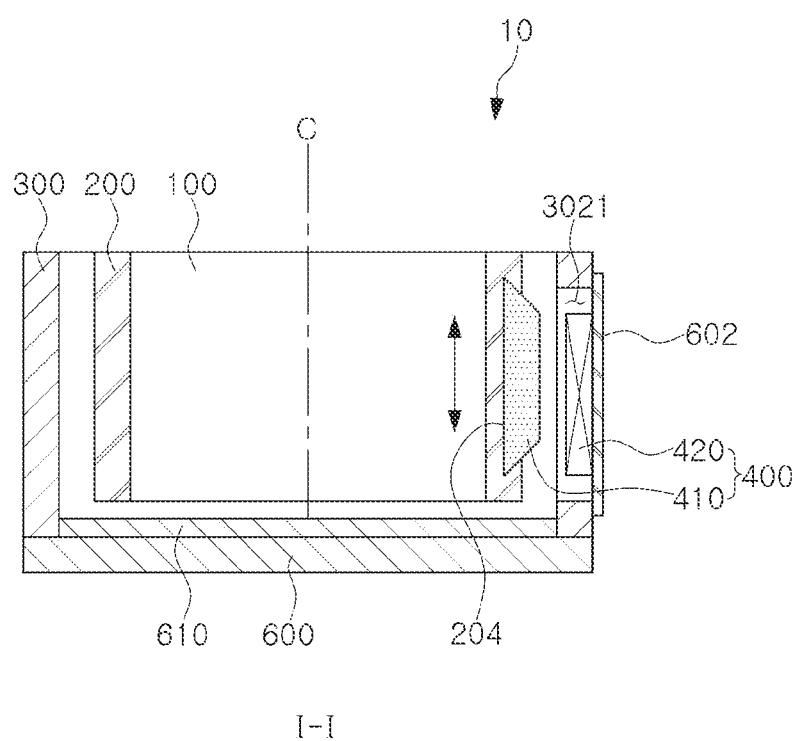
FIGS. 4 and 5 are cross-sectional views of the camera module illustrated in FIG. 3.

The camera module 10 may be configured to enable autofocusing. For example, the camera module 10 may drive the lens barrel 100 and the movable portion 200 in the optical axis C direction through the driving unit 400 as illustrated in FIG. 4. In more detail, the magnetic force generated between the driving magnet 410 and the driving coil 420 may move the lens barrel 100 and the movable portion 200 in the optical axis C direction.

Figure 5:
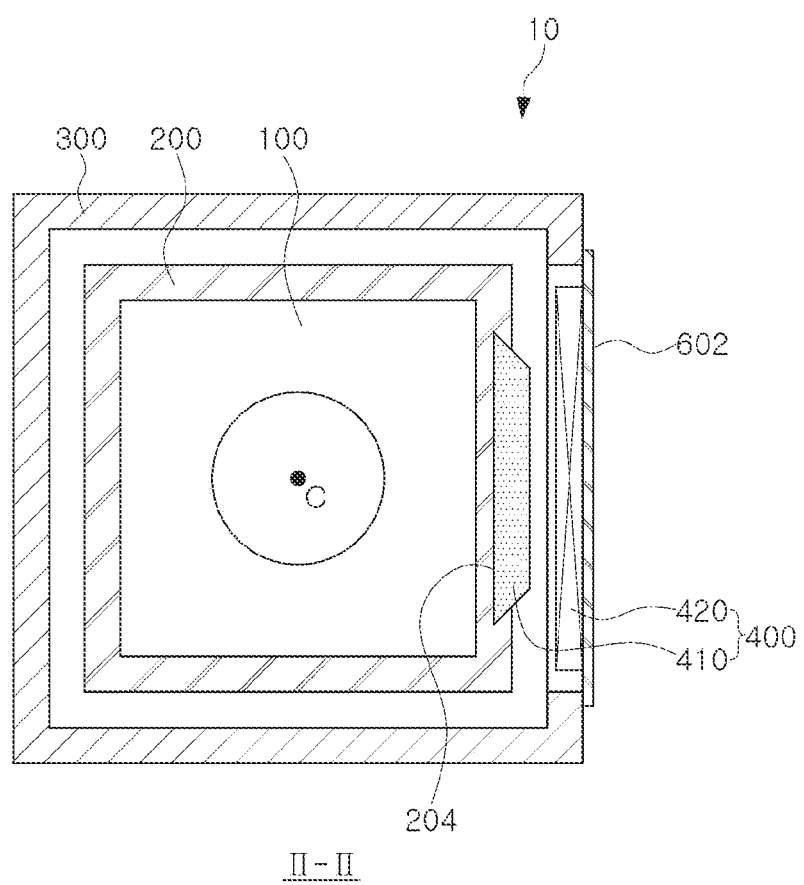
Figure 6:
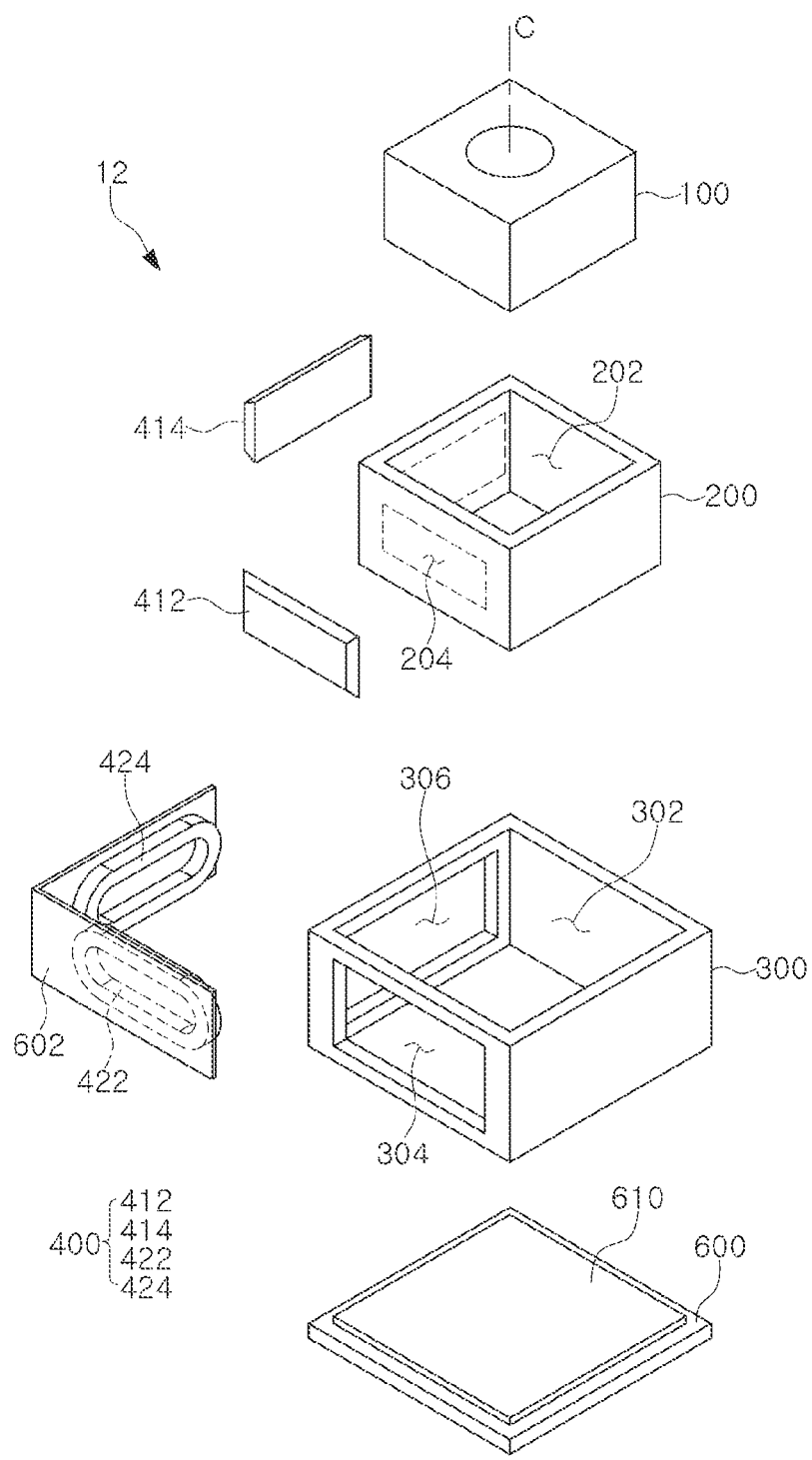
FIG. 6 is an exploded perspective view of a camera module according to another example.

The camera module 10, according to this example, may be configured to reduce a phenomenon in which the driving magnet 410 is separated due to rapid movement and vibrations of the lens barrel 100 and the movable portion 200. In detail, since the driving magnet 410 is disposed in a form firmly fitted into the groove 204 of the movable portion 200 as illustrated in FIGS. 4 and 5, the driving magnet 410 may be prevented from being separated from the movable portion 200 caused due to shocks and vibrations applied to the camera module 10.

Therefore, the camera module 10, according to this example, may secure the driving reliability of the lens barrel 100 by the driving unit 400, and at the same time, may significantly reduce damage to the driving unit 400 due to external shocks and vibrations.

Next, according to another example, a camera module will be described with reference to FIGS. 6 to 9.

A camera module 12, according to an example, may include a lens barrel 100, a barrel holder 200, a housing 300, and a driving unit 400. However, the configuration of the camera module 12 is not limited to the above-described configurations. For example, the camera module 12 may further include a substrate 600 on which an image sensor 610 is mounted.

The lens barrel 100 may include a lens. For example, the lens barrel 100 may include one or more lenses sequentially disposed along the optical axis C. The lens barrel 100 may be configured to form an image on the image sensor 610 by incident light. For example, the lens barrel 100 may form an image on the image sensor 610 by light incident through the lens accommodated in the lens barrel 100. The lens barrel 100 may include a unit for adjusting the amount of incident light. For example, the lens barrel 100 may further include an aperture disposed on the object side of a frontmost lens or between the lens and the lens.

The barrel holder 200 may be configured to be coupled to the lens barrel 100. For example, an accommodation space 202 for accommodating the lens barrel 100 may be formed in the barrel holder 200. The accommodation space 202 may be formed to have substantially the same shape and the same size as the cross-section of the lens barrel 100. Accordingly, the lens barrel 100 may be firmly fixed to the accommodation space 202 of the barrel holder 200. For firm coupling between the lens barrel 100 and the barrel holder 200, an adhesive may be injected into a coupling portion between the lens barrel 100 and the barrel holder 200, or the coupling portion between the lens barrel 100 and the barrel holder 200 may be fused by using a heat source such as a laser.

The housing 300 may be configured to accommodate the lens barrel 100 and the barrel holder 200. For example, an accommodation space 302 accommodating the lens barrel 100 and the barrel holder 200 may be formed in the housing 300. The accommodation space 302 may be formed in an open shape along the optical axis (C). Accordingly, the lens barrel 100 and the barrel holder 200 may move in the optical axis C direction. In addition, the housing 300 may be configured to enable the disposition of the driving unit 400. For example, an opening 304 may be formed in one side of the housing 300 such that some components of the driving unit 400 may be disposed. The opening 304 may be connected to the accommodation space 302 of the housing 300. Accordingly, the driving unit 400 disposed in an inner side of the opening 304 may be exposed to the accommodation space 302.

The driving unit 400 may be configured to drive the lens barrel 100 and the barrel holder 200. For example, the driving unit 400 may drive the lens barrel 100 and the barrel holder 200 in a direction intersecting the optical axis C. The driving unit 400 may include driving magnets 412 and 414 and driving coils 422 and 424. However, the configuration of the driving unit 400 is not limited to the driving magnets 412 and 414 and the driving coils 422 and 424.

The driving unit 400 may be disposed on the barrel holder 200 and the housing 300, respectively. For example, the driving magnets 412 and 414 may be disposed on the barrel holder 200, and the driving coils 422 and 424 may be disposed on the housing 300. The driving magnets 412 and 414 and the driving coils 422 and 424 may be disposed to face each other. For example, the driving magnets 412 and 414 may be disposed on a first side of the barrel holder 200 and a second side adjacent to the first side, which face a first opening 304 and a second opening 306 of the housing 300. The driving coils 422 and 424 may be disposed in the first opening 304 and the second opening 306.

The driving unit 400 may be firmly fixed to the barrel holder 200 and the housing 300. For example, the driving magnets 412 and 414 may be integrally formed with the barrel holder 200, and the driving coils 422 and 424 may be firmly fixed to the openings 304 and 306 of the housing 300 via a flexible substrate 602. For example, the driving magnets 412 and 414 may be integrally molded together with the barrel holder 200 by insert injection or double injection. The driving magnets 412 and 414 may be configured not to be separated from the barrel holder 200. For example, the driving magnets 412 and 414 may be configured to have an inclined surface, like the driving magnet 410 illustrated in FIG. 2.

Figure 7:
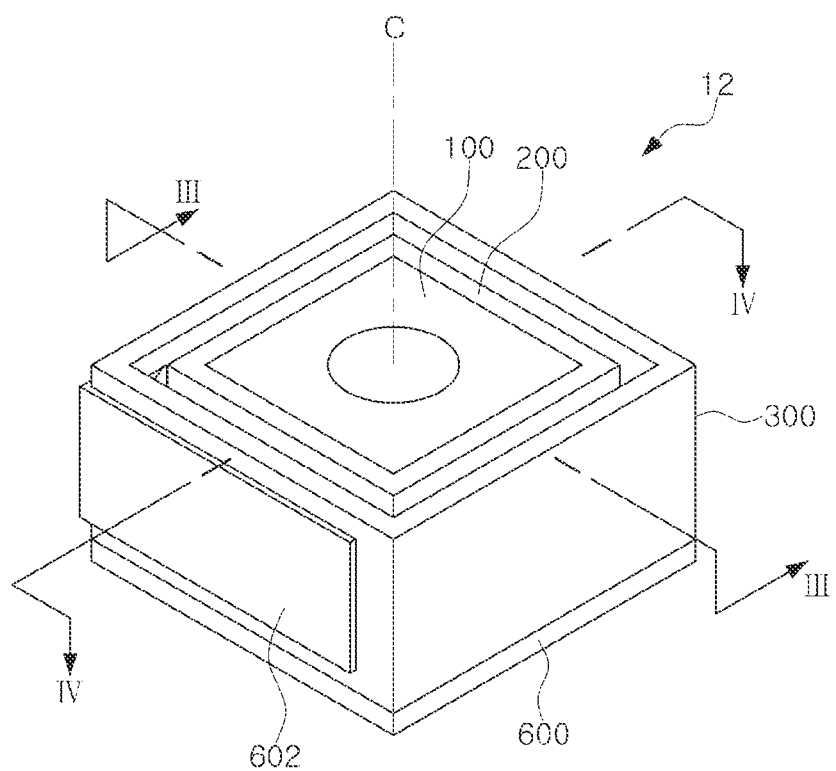
FIG. 7 is an assembled perspective view of the camera module illustrated in FIG. 6.
Figure 8:
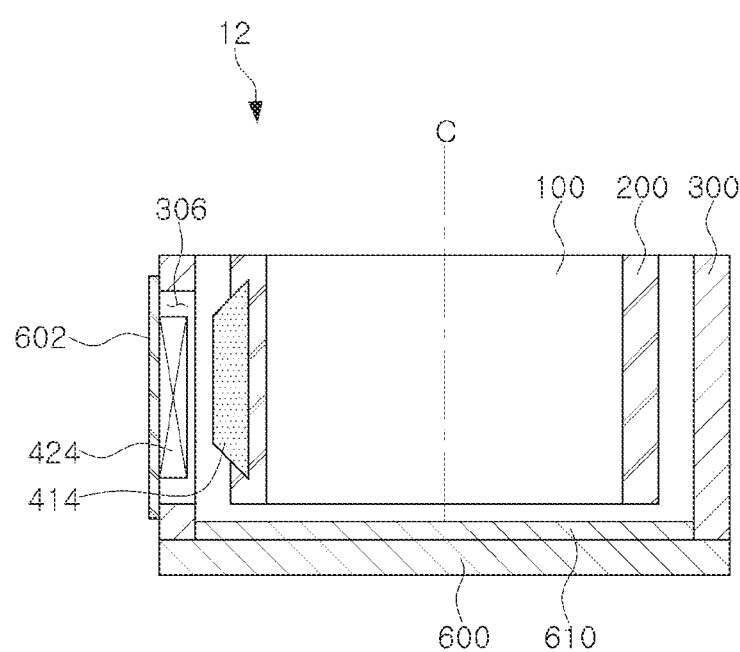
FIGS. 8 and 9 are cross-sectional views of the camera module illustrated in FIG. 7.
Figure 9:
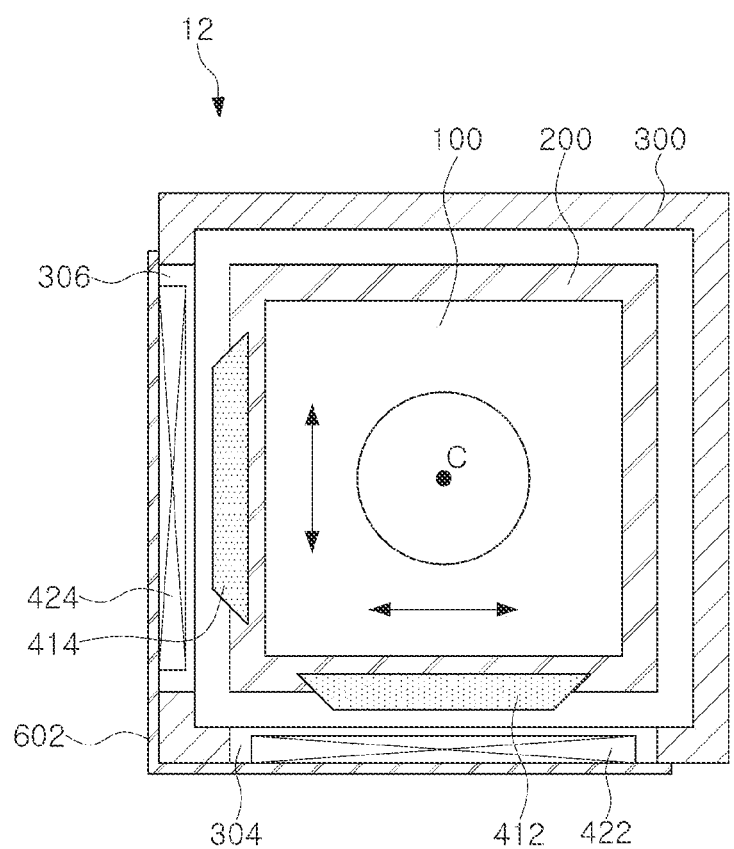
Figure 10:
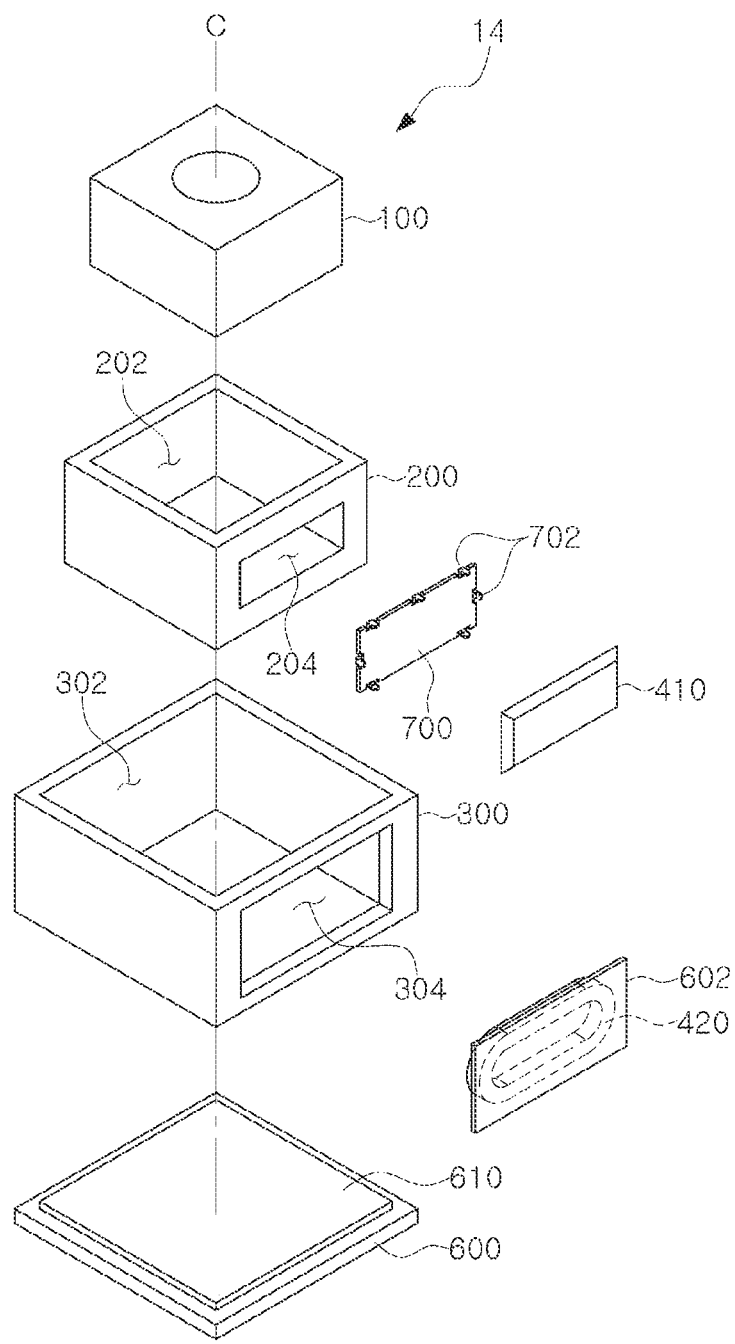
FIG. 10 is an exploded perspective view of a camera module according to another example.
Figure 11:
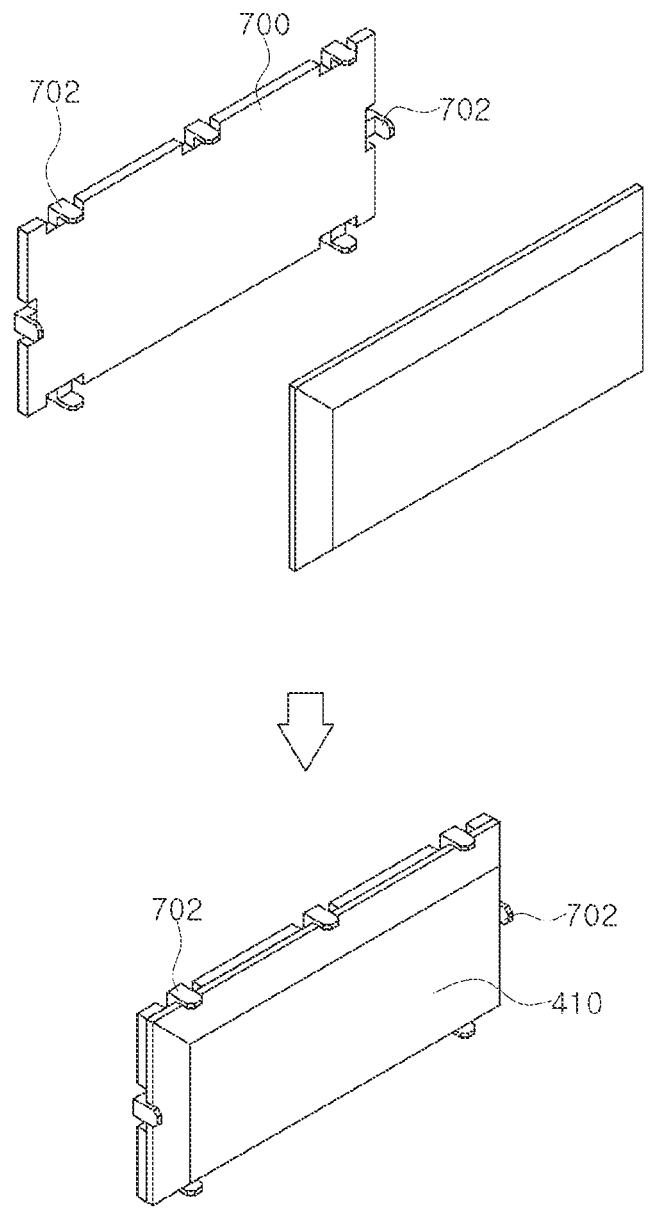
FIG. 11 is a combined perspective view of a driving magnet and a yoke member illustrated in FIG. 10.

The camera module 12, including the above-described components, may be configured to be easily mounted on a small terminal, as illustrated in FIG. 7. In addition, the camera module 12 may be configured to enable optical image stabilization. For example, the camera module 12 may drive the lens barrel 100 and the barrel holder 200 in a direction intersecting the optical axis C through the driving unit 400 as illustrated in FIG. 9. In addition, according to this example, the camera module 12 may be configured to reduce a phenomenon in which the driving magnets 412 and 414 are separated by abrupt movement and vibrations of the lens barrel 100 and the barrel holder 200. In detail, since the driving magnets 412 and 414 are disposed in a form fitted into the barrel holder 200 as illustrated in FIGS. 8 and 9, the driving magnets 412 and 414 may be prevented from being separated from the barrel holder 200 caused by shocks and vibrations applied to the camera module 12.

Therefore, the camera module 12, according to this example, may secure the driving reliability of the lens barrel 100 by the driving unit 400, and at the same time, may significantly reduce the damage of the driving unit 400 due to external shocks and vibrations.

Hereinafter, a camera module, according to another example, will be described with reference to FIGS. 10 to 13.

A camera module 14, according to an example, may include a lens barrel 100, a barrel holder 200, a housing 300, a driving unit 400, and a yoke member 700. However, the configuration of the camera module 14 is not limited to the above-described configurations. For example, the camera module 14 may further include a substrate 600 on which an image sensor 610 is mounted.

The lens barrel 100 may include a lens. For example, the lens barrel 100 may include one or more lenses sequentially disposed along the optical axis C. The lens barrel 100 may be configured to form an image by incident light, on the image sensor 610. For example, the lens barrel 100 may form an image by light incident through the lens accommodated in the lens barrel 100, on the image sensor 610. The lens barrel 100 may include a unit for adjusting the amount of incident light. For example, the lens barrel 100 may further include an aperture disposed on the object side of a frontmost lens or between the lens and the lens.

The barrel holder 200 may be configured to be coupled to the lens barrel 100. For example, an accommodation space 202 for accommodating the lens barrel 100 may be formed in the barrel holder 200. The accommodation space 202 may be formed to have substantially the same shape and the same size as the cross-section of the lens barrel 100. Accordingly, the lens barrel 100 may be firmly fixed to the accommodation space 202 of the barrel holder 200. For firm connection between the lens barrel 100 and the barrel holder 200, an adhesive may be injected into a coupling portion between the lens barrel 100 and the barrel holder 200, or the coupling portion between the lens barrel 100 and the barrel holder 200 may be fused using a heat source such as a laser.

The housing 300 may be configured to accommodate the lens barrel 100 and the barrel holder 200. For example, an accommodation space 302 accommodating the lens barrel 100 and the barrel holder 200 may be formed in the housing 300. The accommodation space 302 may be formed in an open shape along the optical axis (C). Accordingly, the lens barrel 100 and the barrel holder 200 may move in the optical axis C direction. The housing 300 may be configured to enable the disposition of the driving unit 400. For example, an opening 304 may be formed on one side of the housing 300 such that some components of the driving unit 400 may be disposed. The opening 304 may be connected to the accommodation space 302 of the housing 300. Accordingly, the driving unit 400 disposed in an inner side of the opening 304 may be exposed to the accommodation space 302.

The driving unit 400 may be configured to drive the lens barrel 100 and the barrel holder 200. For example, the driving unit 400 may drive the lens barrel 100 and the barrel holder 200 in the optical axis C direction. The driving unit 400 may include a driving magnet 410 and a driving coil 420. However, the configuration of the driving unit 400 is not limited to the driving magnet 410 and the driving coil 420.

The driving unit 400 may be disposed in the barrel holder 200 and the housing 300, respectively. For example, the driving magnet 410 may be disposed on the barrel holder 200, and the driving coil 420 may be disposed on the housing 300. The driving magnet 410 and the driving coil 420 may be disposed to face each other. For example, the driving magnet 410 may be disposed on one side of the barrel holder 200, facing the opening 304 of the housing 300, and the driving coil 420 may be disposed in the opening 304.

The driving unit 400 may be firmly fixed to the barrel holder 200 and the housing 300. For example, the driving magnet 410 may be integrally formed with the barrel holder 200, and the driving coil 420 may be firmly fixed to the opening 304 of the housing 300 via a flexible substrate 602.

For example, the driving magnet 410 may be integrally molded with the barrel holder 200 by insert injection or double injection. The driving magnet 410 may be formed not to be separated from the barrel holder 200. For example, the driving magnet 410 may be configured in the form illustrated in FIG. 2.

The camera module 14, according to this example, further includes the yoke member 700. The yoke member 700 may be firmly coupled to the driving magnet 410. For example, the yoke member 700 may be closely coupled to one surface of the driving magnet 410 via a plurality of protrusions 702 and 704. The yoke member 700 may improve the driving force formed between the driving magnet 410 and the driving coil 420. For example, the yoke member 700 may be attached to one surface of the driving magnet 410 as described above, to enhance the magnetic force of the driving magnet 410. In addition, the yoke member 700 may improve the coupling force between the driving magnet 410 and the barrel holder 200. For example, the yoke member 700 may be integrally formed with the barrel holder 200 and the driving magnet 410 by insert injection or double injection to increase the bonding area between the driving magnet 410 and the barrel holder 200.

Figure 12:
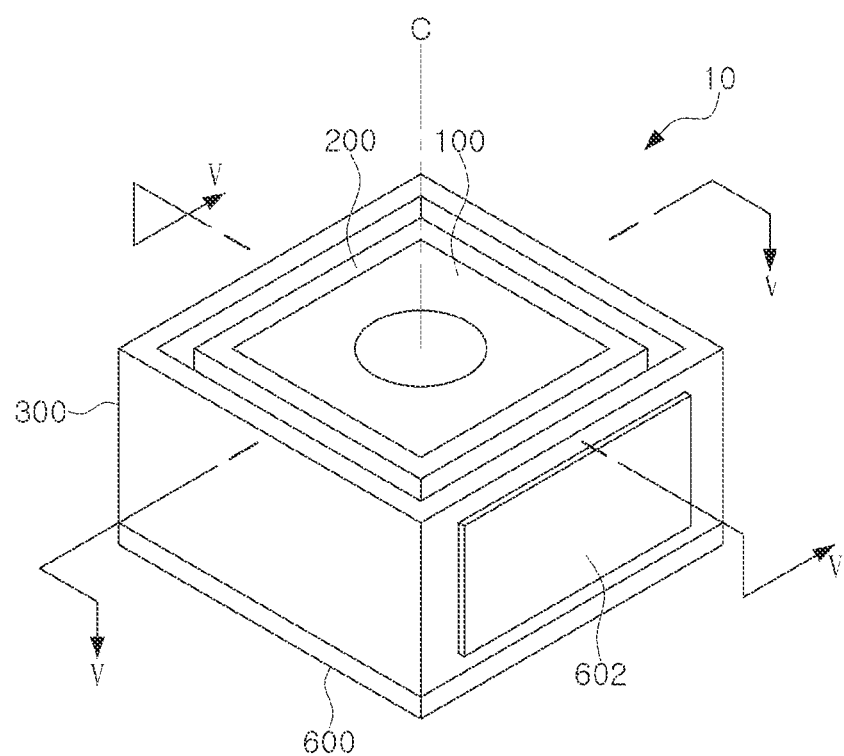
FIG. 12 is a perspective view illustrating the combination of the camera module illustrated in FIG. 10.
Figure 13:
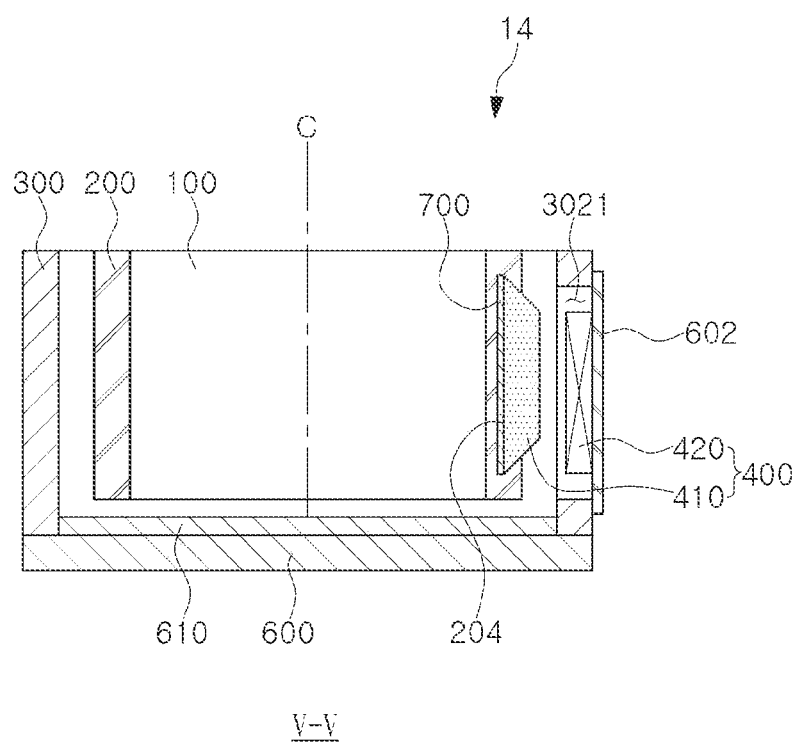
FIG. 13 is a cross-sectional view of the camera module illustrated in FIG. 12.
Figure 14:
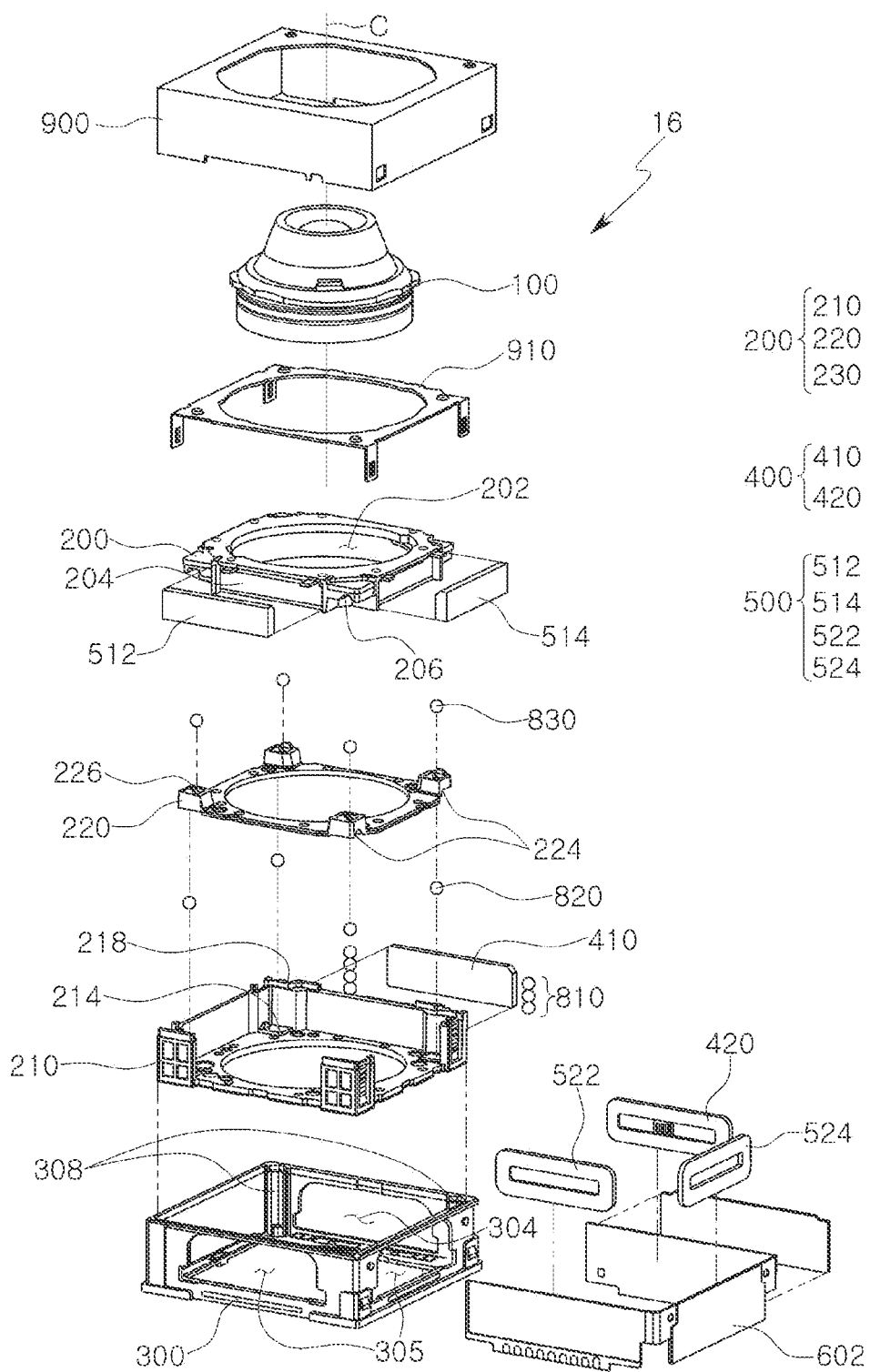
FIG. 14 is an exploded perspective view of a camera module according to another example.

As illustrated in FIG. 12, the camera module 14, including the above-described components, may be configured to have a relatively low height in the optical axis C direction. Therefore, the camera module 14, according to this example, may be easily mounted on a thin and small terminal such as a smartphone.

The camera module 14 may be configured to enable autofocusing. For example, the camera module 14 may drive the lens barrel 100 and the barrel holder 200 in the optical axis C direction by the driving unit 400. In more detail, the magnetic force generated between the driving magnet 410 and the driving coil 420 may move the lens barrel 100 and the barrel holder 200 in the optical axis C direction.

The camera module 14 according to this example may be configured to reduce a phenomenon in which the driving magnet 410 is separated by abrupt movement and vibrations of the lens barrel 100 and the barrel holder 200. In addition, according to this example, the camera module 14 may improve the driving force of the driving unit 400 by the yoke member 700.

Next, according to another example, a camera module will be described with reference to FIGS. 14 to 19.

A camera module 16, according to an example, may include a lens barrel 100, a barrel holder 200, a first movable frame 210, a second movable frame 220, a housing 300, a first driving unit 400, and a second driving unit 500. In addition, the camera module 16 may further include ball bearings 810, 820, and 830, a shield can 900, and a fixing clip 910.

The lens barrel 100 may be formed to have a truncated cone shape of which an upper portion is smaller than a lower portion. The lens barrel 100 is configured to accommodate a lens. For example, one or more lenses sequentially stacked along the optical axis C may be disposed inside the lens barrel 100.

The barrel holder 200 is configured to be coupled to the lens barrel 100. For example, a hole 202 that is open may be formed in the center of the barrel holder 200, into which the lens barrel 100 may be inserted. The hole 202 may be open in the optical axis C direction. The center of the hole 202 may be formed to coincide with the optical axis C of the lens barrel 100. The barrel holder 200 may be configured to receive a portion of the second driving unit 500. For example, mounting grooves 204 in which second driving magnets 512 and 514 of the second driving unit 500 are to be disposed may be formed in two side surfaces of the barrel holder 200, respectively.

The first movable frame 210 and the second movable frame 220 are configured to support the barrel holder 200. For example, the second movable frame 220 is configured to support the barrel holder 200, and the first movable frame 210 is configured to support the barrel holder 200 via the second movable frame 220.

The second movable frame 220 may support the barrel holder 200 to enable movement of the barrel holder 200. For example, the second movable frame 220 may support the barrel holder 200 in such a manner that the barrel holder 300 may move in a first direction intersecting the optical axis C. A ball bearing 830 facilitating movements of the barrel holder 200 may be disposed between the second movable frame 220 and the barrel holder 200. In more detail, the ball bearing 830 may be disposed between a groove 206 of the barrel holder 200 and a groove 226 of the second movable frame 220. The grooves 206 and 226 may be formed to limit the moving direction of the barrel holder 200. For example, the grooves 206 and 226 may extend in the first direction intersecting the optical axis C to limit the moving direction of the barrel holder 200 to the first direction intersecting the optical axis C.

The first movable frame 210 is configured to support the second movable frame 220. The first movable frame 210 may support the second movable frame 220 so that the second movable frame 220 may move. For example, the first movable frame 210 may support the second movable frame 220 such that the second movable frame 220 may move in a direction intersecting the optical axis C. Friction between the first movable frame 210 and the second movable frame 220 may be reduced by the ball bearing 820. The ball bearing 820 may be disposed between the groove 214 of the first movable frame 210 and the groove 224 of the second movable frame 220. The grooves 214 and 224 may be formed to limit the moving direction of the second movable frame 220. For example, the grooves 214 and 224 are formed to extend in a second direction intersecting the optical axis C, such that the moving direction of the second movable frame 220 is limited to the second direction intersecting the optical axis C.

The first driving unit 400 may be disposed on the first movable frame 210. In detail, the first driving magnet 410 of the first driving unit 400 may be disposed on a first side of the first movable frame 210. In addition, the ball bearing 810 may be disposed on the first side of the first movable frame 210. In more detail, the ball bearing 810 may be disposed in a groove 218 of the first side. The first movable frame 210 may be formed to have a shape of which at least two side surfaces are open in a direction intersecting the optical axis C. For example, two adjacent sides of the first movable frame 210 may be partially open in such a manner that the second driving magnets 512 and 514 mounted on the barrel holder 200 face the second driving coils 522 and 524.

The first movable frame 210 may be configured to be driven in a direction different from that of the barrel holder 200 and the second movable frame 220. For example, the first movable frame 210 may be driven in the optical axis C direction by the first driving unit 400. The first movable frame 210 may be configured to accommodate the barrel holder 200 and the second movable frame 220. For example, in the inner space of the first movable frame 210, the second movable frame 220, and the barrel holder 200 may be sequentially disposed in the optical axis C direction. Accordingly, when the first movable frame 210 moves in the optical axis (C) direction, the second movable frame 220 and the barrel holder 200 may also move together in the optical axis (C) direction. On the other hand, since the barrel holder 200 and the second movable frame 220 are movable only in the space inside of the first movable frame 210, the movement of the barrel holder 200 and the second movable frame 220 may not affect the driving of the first movable frame 210.

The housing 300 may be configured to accommodate the lens barrel 100, the barrel holder 200, the first movable frame 210, and the second movable frame 220. The housing 300 may accommodate the first movable frame 210 in such a manner that the first movable frame 210 may move. The ball bearing 810 may be disposed between the housing 300 and the first movable frame 210. In more detail, the ball bearing 810 is disposed between a guide groove 308 of the housing 300 and a groove 218 of the first movable frame 210, to enable the first movable frame 210 to smoothly move in the optical axis C direction. Openings 304 and 305 may be formed in at least three sides of the housing 300. Driving units 400 and 500 may be disposed in the openings 304 and 305, respectively. In detail, a first driving magnet 410 and a first driving coil 420 are disposed to face each other in one first opening 304, and second driving magnets 512 and 514 and second driving coils 522 and 524 may be disposed to face each other in two second openings 305.

The first driving unit 400 includes the first driving magnet 410 and the first driving coil 420. The first driving magnet 410 may be disposed on the first movable frame 210, and the first driving coil 420 may be disposed in the first opening 304 of the housing 300. The first driving magnet 410 and the first driving coil 420 may provide driving force required to move the first movable frame 210 in the optical axis C direction. In detail, the first movable frame 210 may move in the optical axis C direction by the first driving magnet 410 and the first driving coil 420. The first movable frame 210 may be moved together with the lens barrel 100 accommodated therein. Accordingly, the autofocusing of the camera module 16 may be performed naturally according to the movement of the first movable frame 210 in the optical axis C direction.

The second driving unit 500 includes second driving magnets 512 and 514 and second driving coils 522 and 524. The second driving magnets 512 and 514 may be disposed on the barrel holder 200, and the second driving coils 522 and 524 may be disposed in the second opening 305 of the housing 300. The second driving magnets 512 and 514 and the second driving coils 522 and 524 may provide driving force required to move the barrel holder 200 in a direction intersecting the optical axis C. In detail, the second driving magnet 512 and the second driving coil 522 may drive the barrel holder 200 in a first direction intersecting the optical axis C, and the second driving magnet 514 and the second driving coil 524 may drive the barrel holder 200 in a second direction intersecting the optical axis C via the second movable frame 220. Accordingly, the optical image stabilization of the camera module 16 may be naturally performed by the movement of the barrel holder 200 driven by the second driving unit 500.

The flexible substrate 602 is configured to support the first driving coil 420 and the second driving coils 522 and 524. For example, the flexible substrate 602 may fix the first driving coil 420 and the second driving coils 522 and 524 to the outside side of the housing 300, such that the first driving coil 420 and the second driving coils 522 and 524 may face the first driving magnet 410 and the second driving magnets 512 and 514, respectively. The flexible substrate 602 may be configured to provide current and control signals to the first driving coil 420 and the second driving coils 522 and 524. For example, the flexible substrate 602 may be connected to an external power source and an external control device to supply currents and control signals to the first driving coil 420 and the second driving coils 522 and 524.

The fixing clip 910 may be configured to prevent separation of the barrel holder 200 and the second movable frame 220 from the first movable frame 210. For example, the fixing clip 910 is coupled to the first movable frame 210 in a state in which the fixing clip 910 presses the upper portion of the barrel holder 200, thereby preventing the barrel holder 200 and the second movable frame 220 from being separated from the first movable frame 210.

The shield can 900 is configured to shield an upper partial region and four sides of the housing 300. The shield can 900 may be configured to prevent malfunction of the camera module 16 due to harmful electromagnetic waves. For example, the shield can 900 may be formed of a metal material to block magnetic field interference of the first driving unit 400 and the second driving unit 500 by harmful electromagnetic waves.

The camera module 16, according to this example, is configured to reduce a phenomenon in which external shocks and vibrations damage the driving units 400 and 500. For example, the camera module 16 may be configured to reduce a phenomenon in which the first driving magnet 410 is separated from the first movable frame 210 by external shocks and vibrations. In detail, the first driving magnet 410 may be integrally formed with the first movable frame 210 so as not to be separated from the first movable frame 210 by external shocks and vibrations.

The coupling structure of the first driving magnet 410 and the first movable frame 210 will be described with reference to FIGS. 15 to 18.

Figure 16:
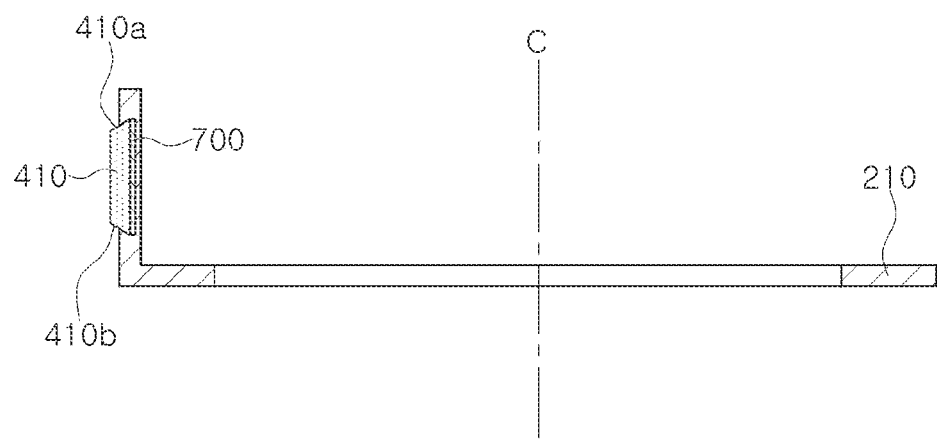
FIG. 16 is a cross-sectional view of the first movable frame illustrated in FIG. 15.

The first driving magnet 410 may be integrally formed with the first movable frame 210 by double injection or insert injection. In addition, as illustrated in FIG. 16, the first driving magnet 410 may be configured in a form including inclined surfaces 410a and 410b or having the cross-sectional area decreasing as the distance from the optical axis C is increased, so as not to be easily separated from the first movable frame 210. In the shape of the first driving magnet 410, since the area of the part embedded in the inside of the first movable frame 210 is larger than the area of the part exposed to the outside of the first movable frame 210, a phenomenon in which the first driving magnet 410 is separated from the first movable frame 210 due to external shocks and vibrations may be effectively suppressed.

Figure 15:
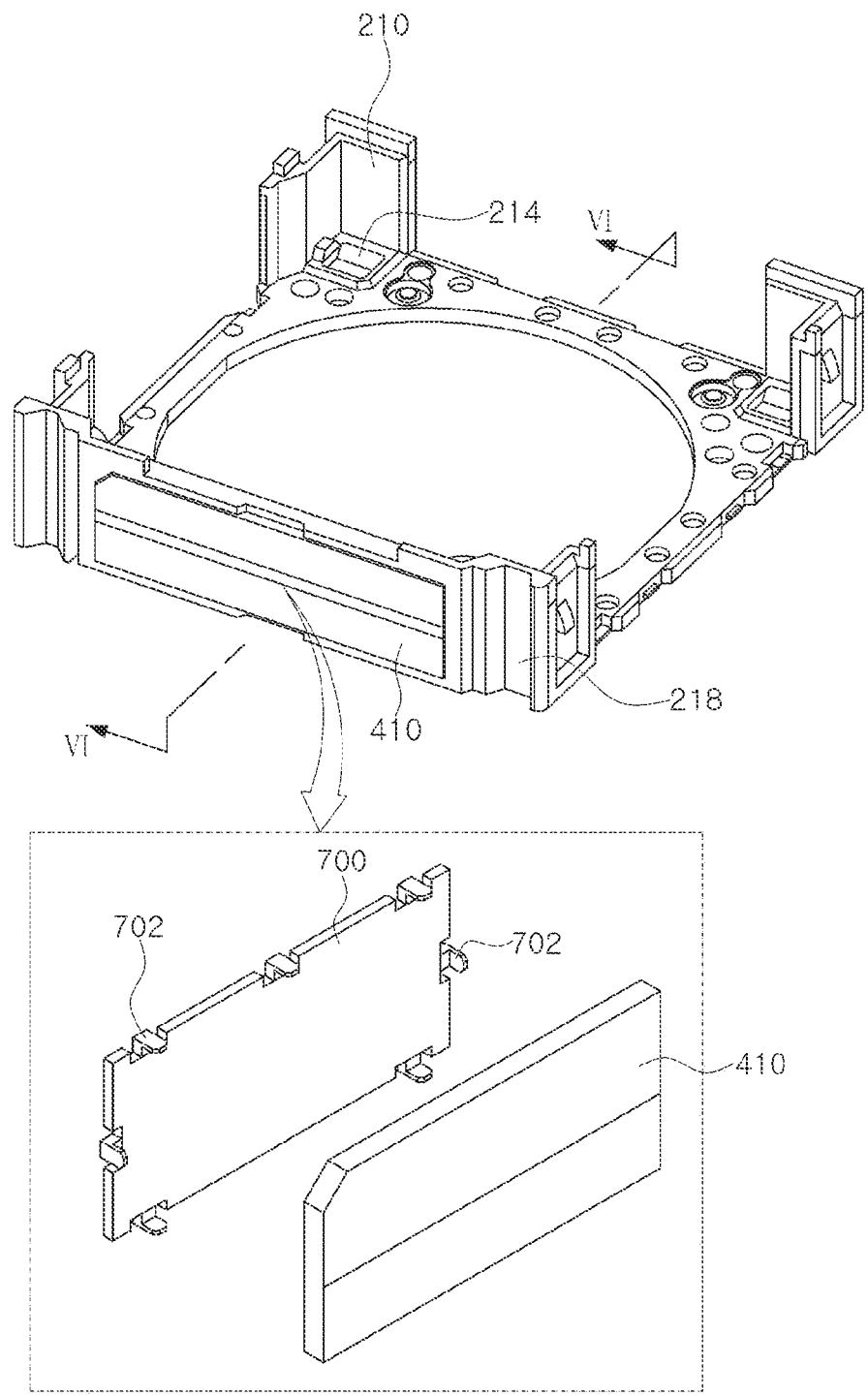
FIG. 15 is a perspective view illustrating the combination of a first movable frame and a first driving magnet illustrated in FIG. 14.

The first driving magnet 410 may be integrally formed with the first movable frame 210 together with a yoke member 700, as illustrated in FIGS. 15 and 16. The yoke member 700 includes a protrusion 702 for coupling with the first driving magnet 410, and may serve to fix the position of the first driving magnet 410 in the insert injection or double injection process. In addition, the yoke member 700 may reduce the magnetic force degradation of the first driving magnet 410 that may be caused during the insert injection or double injection process.

Figure 17:
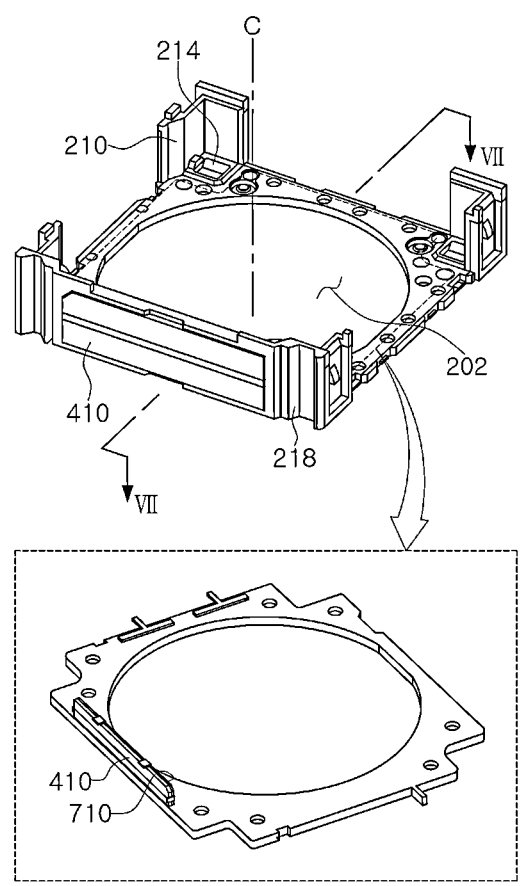
FIG. 17 is a perspective view of a combination of a first movable frame and a first driving magnet according to a modified example.
Figure 18:
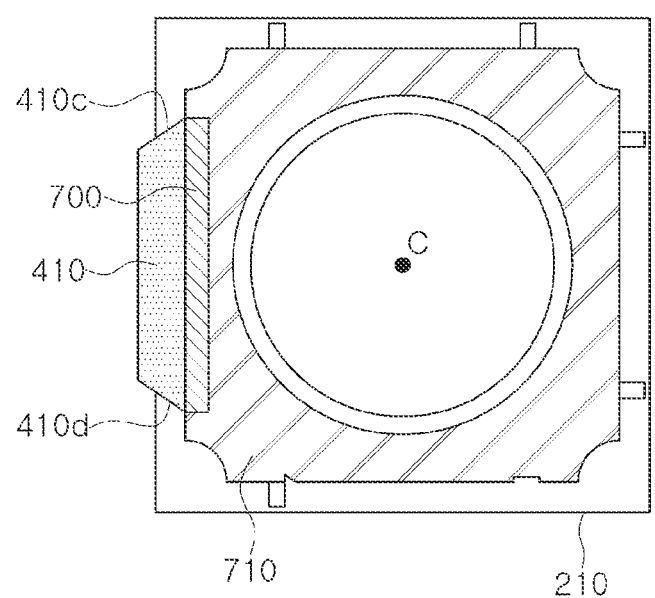
FIG. 18 is a cross-sectional view of the first movable frame illustrated in FIG. 17.
Figure 19:
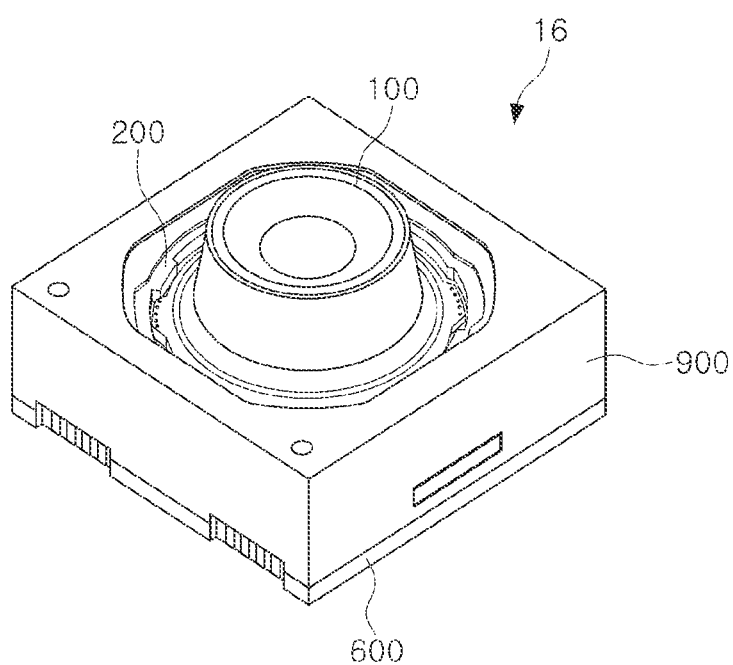
FIG. 19 is an assembled perspective view of the camera module illustrated in FIG. 15.

The first driving magnet 410 may be integrally formed with the first moving frame 210 together with the yoke member 700 and a reinforcing member 710 as illustrated in FIGS. 17 and 18. In addition, the first driving magnet 410 may be configured in the form including inclined surfaces 410c and 410d having the cross-sectional area decreasing as the distance from the optical axis C is increased, as illustrated in FIG. 18, so as not to be easily separated from the first movable frame 210.

The yoke member 700 and the reinforcing member 710 may be formed of the same material and firmly coupled by a method such as welding. For example, the yoke member 700 and the reinforcing member 710 may be formed of a metal material to improve the rigidity of the first movable frame 210. The yoke member 700 and the reinforcing member 710 may serve to fix the position of the first driving magnet 410 in the insert injection or double injection process. In detail, the yoke member 700 is fixed to the reinforcing member 710 in a state in which it is coupled to the first driving magnet 410, thereby preventing a phenomenon in which the position of the first driving magnet 410 is changed by casting.

On the other hand, in the present specification, only the coupling form between the first driving magnet 410 and the first movable frame 210 is described, but the second driving magnets 512 and 514 and the barrel holder 200 may also be integrally formed by insert injection or double injection. In addition, the second driving magnets 512 and 514 may also be firmly formed on the barrel holder 200 by the yoke member 700 and the reinforcing member 710.

In the camera module 16 configured as above, the first driving magnet 410 is integrally formed with the first movable frame 210 together with the yoke member 700 or together with the yoke member 700 and the reinforcing member 710. Therefore, the change in the position of the first driving magnet 410 or the separation of the first driving magnet 410 from the first movable frame 210 due to external shocks and vibrations may be effectively suppressed. Accordingly, according to this example, the camera module 16 may improve the operation reliability by the driving units 400 and 500.

As set forth above, according to an example, a camera module in which the driving reliability of autofocusing (AF) or optical image stabilization (01S) function may be improved may be provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A camera module comprising:
a movable portion including a lens barrel;
an accommodating portion configured to receive the movable portion;
a driving unit configured to drive the movable portion, comprising a driving magnet integrated with the movable portion; and
a yoke member, disposed on a surface of the driving magnet, integrally formed with the movable portion and the driving magnet, wherein a cross-sectional area of the driving magnet decreases as a distance thereof from an optical axis increases.

2. The camera module of claim 1, wherein a cross-sectional shape of the driving magnet in the optical axis direction is trapezoidal.

3. The camera module of claim 1, wherein a cross-sectional shape of the driving magnet in a direction, intersecting the optical axis, is trapezoidal.

4. The camera module of claim 1, wherein the driving magnet is accommodated within a groove of the movable portion.

5. The camera module of claim 1, wherein the driving unit is configured to drive the movable portion in the optical axis direction.

6. The camera module of claim 1, wherein the driving unit is configured to drive the movable portion in a direction intersecting the optical axis.

7. The camera module of claim 6, wherein the driving magnet is disposed on each of a first side of the movable portion and a second side adjacent to the first side.

8. The camera module of claim 1, wherein the yoke member comprises a protrusion configured to engage the driving magnet.

9. A camera module comprising:
a housing;
a first movable frame accommodated in the housing;
a second movable frame disposed on the first movable frame;
a lens barrel, disposed on the second movable frame, comprising a lens;
a first driving unit, configured to drive the first movable frame in a direction of an optical axis of the lens, comprising a first driving magnet integrally formed with the first movable frame;
a second driving unit configured to drive the second movable frame and the lens barrel in a direction intersecting the optical axis; and
a yoke member disposed on a side of the first driving magnet and integrally formed with the first movable frame and the first driving magnet,
wherein the first driving magnet has an inclined surface with respect to the optical axis.

10. The camera module of claim 9, wherein the first driving unit further comprises a first driving coil disposed on the housing to face the first driving magnet.

11. The camera module of claim 9, wherein the second driving unit comprises,
a second driving magnet comprising a first magnet and a second magnet disposed on different side surfaces of a barrel holder coupled to the lens barrel; and
a second driving coil comprising a first coil and a second coil disposed on the housing to face the first magnet and the second magnet, respectively.

12. The camera module of claim 9, further comprising:
a first ball bearing disposed between the housing and the first movable frame;
a second ball bearing disposed between the first movable frame and the second movable frame; and
a third ball bearing disposed between the second movable frame and a barrel holder coupled to the lens barrel.

13. The camera module of claim 12, wherein the yoke member further comprises a protrusion configured to couple to the first driving magnet.

14. The camera module of claim 12, wherein the first movable frame further comprises a reinforcing member integrally formed with the first movable frame, connected to the yoke member, and configured to prevent deformation of the first movable frame.

15. A camera module comprising:
a movable portion including a lens barrel;
an accommodating portion configured to receive the movable portion;
a driving unit configured to drive the movable portion, comprising a driving magnet integrally formed with the movable portion; and
a yoke disposed on a side of the driving magnet and integrally formed with the movable portion and the first magnet,
wherein the driving magnet has a beveled edge.

16. The camera module of claim 15, wherein the driving magnet is accommodated within a groove of the movable portion.

17. The camera module of claim 15, wherein the driving unit is configured to drive the movable portion in an optical axis direction.

18. The camera module of claim 15, wherein the driving unit is configured to drive the movable portion in a direction intersecting an optical axis of the camera module.

* * * * *